United States Patent
Kapoor et al.

(10) Patent No.: US 10,423,608 B2
(45) Date of Patent: Sep. 24, 2019

(54) DYNAMIC DIRECTORY OF OBJECTS BASED ON LOGICAL ATTRIBUTES

(71) Applicant: International Business Machines Corporation, Armonk, NY (US)

(72) Inventors: Shalini Kapoor, Bangalore (IN); Shachi Sharma, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 14/922,299

(22) Filed: Oct. 26, 2015

(65) Prior Publication Data

US 2017/0116257 A1 Apr. 27, 2017

(51) Int. Cl.
G06F 16/22 (2019.01)
G06F 16/23 (2019.01)
G06F 16/951 (2019.01)

(52) U.S. Cl.
CPC ...... *G06F 16/2379* (2019.01); *G06F 16/2246* (2019.01); *G06F 16/2272* (2019.01); *G06F 16/951* (2019.01)

(58) Field of Classification Search
CPC ................................................. G06F 17/30327
See application file for complete search history.

(56) References Cited

U.S. PATENT DOCUMENTS

| | | | |
|---|---|---|---|
| 8,671,099 B2 | 3/2014 | Kapoor et al. | |
| 2002/0026592 A1* | 2/2002 | Gavrila | G06F 21/6218 726/6 |
| 2002/0174089 A1* | 11/2002 | Tenorio | G06F 17/30867 |
| 2004/0225663 A1* | 11/2004 | Wayt | G06F 17/30563 |
| 2006/0069883 A1* | 3/2006 | Shimizu | G06F 17/30587 711/154 |
| 2006/0230078 A1* | 10/2006 | McConaughy | H04L 67/1095 |
| 2008/0256090 A1* | 10/2008 | Dietterich | G06F 9/5016 |
| 2010/0293241 A1 | 11/2010 | Bishel | |
| 2012/0108230 A1 | 5/2012 | Stepanian | |
| 2014/0241354 A1 | 8/2014 | Shuman et al. | |

(Continued)

OTHER PUBLICATIONS

Zeilenga, K., "Lightweight Directory Access Protocol (LDAP): Technical Specification Road Map", Network Working Group, RFC 4510, OpenLDAP Foundation, Jun. 2006, Copyright (C) The Internet Society (2006), <https://tools.ietf.org/html/rfc4510>, 8 pages.

*Primary Examiner* — Kris E Mackes
(74) *Attorney, Agent, or Firm* — Edward J. Wixted, III

(57) ABSTRACT

A method, computer program product, and computer system for creating a dynamic directory of objects. A request to modify a dynamic directory of a plurality of objects is received. Each of the plurality of objects is associated with one or more attribute-value pairs. One or more first object attribute-value pairs is determined for a first object. The dynamic directory is searched for the one or more first object attribute-value pairs. A first attribute-value pair is identified from the one or more first object attribute-value pairs. The first attribute-value pair is different than the one or more attribute-value pairs associated with the plurality of objects. The dynamic directory is modified based on the first attribute-value pair. Modifying the dynamic directory includes at least one of adding the first object to the dynamic directory, deleting the first object from the dynamic directory, and modifying an attribute-value pair of the first object.

17 Claims, 10 Drawing Sheets

(56) References Cited

U.S. PATENT DOCUMENTS

| | | | |
|---|---|---|---|
| 2014/0379878 A1 | 12/2014 | Bandyopadhyay et al. | |
| 2015/0120776 A1* | 4/2015 | Gopalan | G06F 17/30545 707/769 |
| 2015/0186393 A1* | 7/2015 | Serlet | G06F 17/30097 707/828 |

* cited by examiner

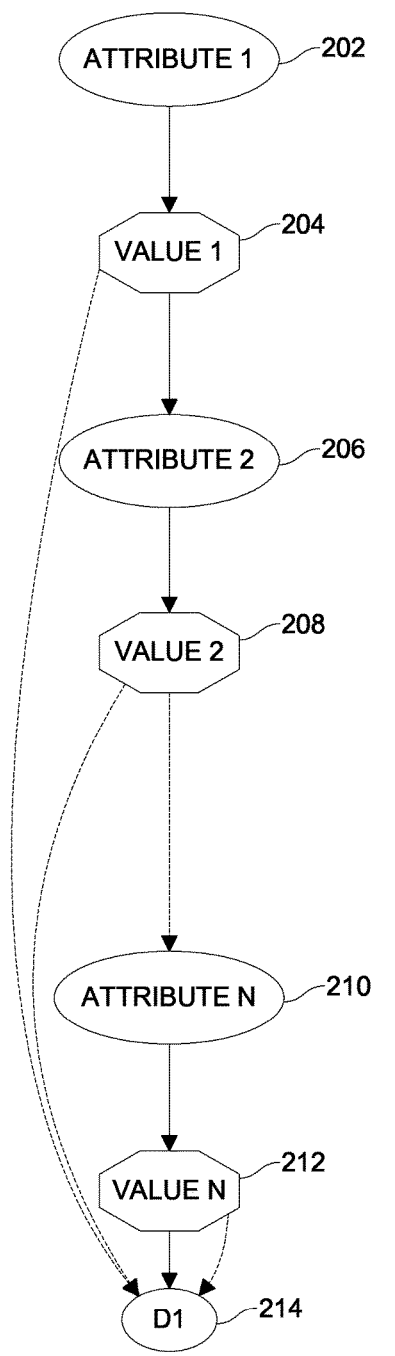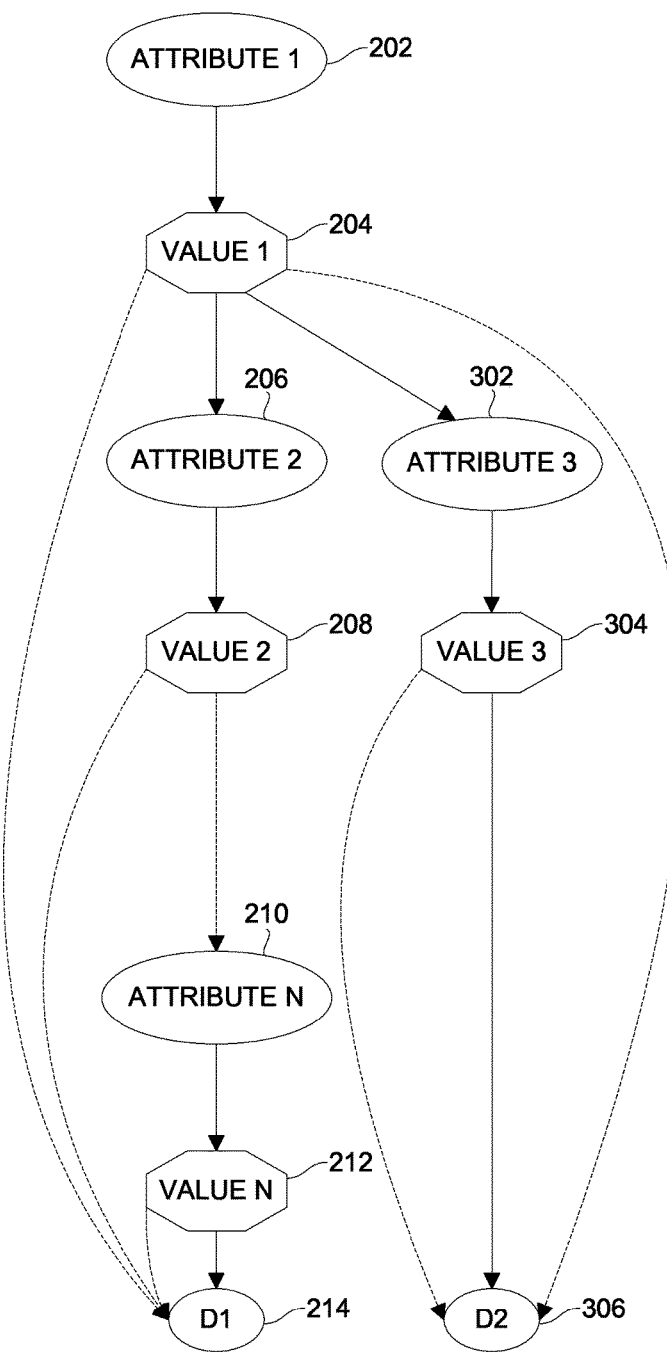
FIG. 2
FIG. 3

```
BRANCH(value, depth)
// The root is at depth '0'.
1. len <- Length[value]
2. hash_value <- HASH(value[len - depth])
    // Hash() is a call to a hash function that returns a hash value in the range 1-'M'.
3. RETURN hash_value
```

FIG. 8

```
SEARCH(root, value, depth)
// The root is at depth '0'.
1. h <- HASH(value)
2. node <- root.HashPart[h]
3. WHILE(node is not NULL)
4.     DO IF node.Value = value
5.            THEN RETURNnode
6.        node <- node.Next
7. IF depth >= Length(value)
8.     THEN RETURN NULL
9. ELSE RETURN SEARCH(root.REF[BRANCH(value,depth)],value,depth + 1)
```

FIG. 9

```
DELETION_SCHEME(root,value,deviceID)
// The root is at depth '0'.
1. node <- SEARCH(root,value,0)
2. IF node is not NULL
3.     THEN Remove deviceID from node.DeviceList
4. ELSE RETURN
5. IF node.DeviceList is Empty AND node.Next == NULL
6.     THEN Mark node as "Not Occupied"
7.         PREV[node].Next = NULL
            // Referring to the node previous to the current node.
8. ELSE IF node.DeviceList is Empty
9.     THEN Mark node as "Not Occupied"
10. RETURN
```

FIG. 10

```
INSERTION_SCHEME(root, value, deviceID)
// The root is at depth '0'.
1. node <- SEARCH(root,value,0)
2. IF node is NULL
3.     THEN INSERT(root,value,deviceID,0)
4. ELSE Add deviceID to node.DeviceList AND mark node as "Occupied" if marked otherwise
5. RETURN
```

FIG. 11

**INSERT(*root*, *value*, deviceID, *depth*)**

// The root is at depth '0'.

1. IF depth >= Length(value)
2.     THEN flag <- 1
3. ELSE flag <- 0
4. h <- HASH(value)
5. node <- root.HashPart[h]
6. WHILE(node is not NULL)
7.     DO IF node is marked "Empty"
   // Status "Empty" means that the node is part of a skip-list but is not occupied by a valid 'value'.
8.         THEN Insert value at node ADD initialize node.DeviceList with deviceID
9.         RETURN
10.    last <- node
    // To keep track of the last node of the skip list.
11.    IF(Length(node.Value) > Length(value) AND flag = 1)
12.       THEN rep_node <- node
13.         flag <- 0
14.    node <- node.Next
15. FOR i <- 1 TO LPLength
    // LPLength is the length of the LinearPart[q+1 .... N] of 'root'
16.    DO IF LinearPart[i] is marked "Not Occupied"
17.       THEN Insert value at root.LinearPart[i] ADD initialize node.DeviceList with deviceID
18.         last.Next <- root.LinearPart[i]
19.         root.LinearPart[i].Next <- NULL
20.         RETURN
21. IF depth<Length(value)
22.    THEN INSERT(root.REF[BRANCH(value, depth)], value, deviceID, depth + 1)
    // Recurse with 'value' as still unexplored characters left.
23.       RETURN
24. ELSE IF flag = 0
25.    THEN val <- rep_node.Value
26.       DList <- rep_node.DeviceList
27.       Insert value at rep_node and ADD initialize rep_node.DeviceList with deviceID
28.       INSERT(root.REF[BRANCH(val, depth)], val, DList, depth + 1)
    // Recurse now with 'val' instead of 'value'.
29.       RETURN
30. // Since at this position no more branching is possible, hence Insert the value at the end of root's Over Flow List OFL[]{Assume that 'l' is the last index} and link last to OFL[l], last.Next <- root.OFL[l].
31. RETURN

FIG. 12

DYNAMIC DIRECTORY OF OBJECTS BASED ON LOGICAL ATTRIBUTES

TECHNICAL FIELD

The present invention relates generally to the field of internet of things (IoT) and, more particularly, to a dynamic directory of objects based on logical attributes.

BACKGROUND OF THE INVENTION

The internet of things (IoT) is the network of physical objects or "things" embedded with electronics, software, sensors, and network connectivity to enable objects to collect and exchange data with one or more connected devices. The IoT allows objects to be sensed and controlled remotely across a network infrastructure. Each object is characterized by a one or more attributes, and is therefore uniquely identifiable. Identification and discovery of all objects facilitates open communication among objects.

SUMMARY

According to one embodiment of the present disclosure, a method for creating a dynamic directory of objects is provided. The method includes receiving, by one or more processors, a request to modify a dynamic directory of a plurality of objects, wherein each of the plurality of objects is associated with one or more attribute-value pairs; determining, by one or more processors, one or more first object attribute-value pairs associated with a first object; searching, by one or more processors, the dynamic directory for the one or more first object attribute-value pairs; identifying, by one or more processors, a first attribute-value pair of the one or more first object attribute-value pairs, wherein the first attribute-value pair is different than the one or more attribute-value pairs associated with the plurality of objects; and modifying, by one more processors, the dynamic directory based on the first attribute-value pair, wherein modifying the dynamic directory comprises at least one of (i) adding the first object to the dynamic directory, (ii) deleting the first object from the dynamic directory, and (iii) modifying an attribute-value pair of the first object.

According to another embodiment of the present disclosure, a computer program product for creating a dynamic directory of objects is provided. The computer program product comprises a computer readable storage medium and program instructions stored on the computer readable storage medium. The program instructions include program instructions to program instructions to receive a request to modify a dynamic directory of a plurality of objects, wherein each of the plurality of objects is associated with one or more attribute-value pairs; program instructions to determine one or more first object attribute-value pairs associated with a first object; program instructions to search the dynamic directory for the one or more first object attribute-value pairs; program instructions to identify a first attribute-value pair of the one or more first object attribute-value pairs, wherein the first attribute-value pair is different than the one or more attribute-value pairs associated with the plurality of objects; and program instructions to modify the dynamic directory based on the first attribute-value pair, wherein modifying the dynamic directory comprises at least one of (i) adding the first object to the dynamic directory, (ii) deleting the first object from the dynamic directory, and (iii) modifying an attribute-value pair of the first object.

According to another embodiment of the present disclosure, a computer system for creating a dynamic directory of objects is provided. The computer system includes one or more computer processors, one or more computer readable storage media, and program instructions stored on the computer readable storage media for execution by at least one of the one or more processors. The program instructions include program instructions to program instructions to receive a request to modify a dynamic directory of a plurality of objects, wherein each of the plurality of objects is associated with one or more attribute-value pairs; program instructions to determine one or more first object attribute-value pairs associated with a first object; program instructions to search the dynamic directory for the one or more first object attribute-value pairs; program instructions to identify a first attribute-value pair of the one or more first object attribute-value pairs, wherein the first attribute-value pair is different than the one or more attribute-value pairs associated with the plurality of objects; and program instructions to modify the dynamic directory based on the first attribute-value pair, wherein modifying the dynamic directory comprises at least one of (i) adding the first object to the dynamic directory, (ii) deleting the first object from the dynamic directory, and (iii) modifying an attribute-value pair of the first object.

BRIEF DESCRIPTION OF THE DRAWINGS

FIG. 2 illustrates a directed acyclic graph (DAG) of a single object in a dynamic directory of objects based on logical attributes, on a computing device within the computing environment of FIG. 1, in accordance with an embodiment of the present disclosure;

FIG. 3 illustrates superimposed DAGs of two objects in a dynamic directory of objects based on logical attributes, on a computing device within the computing environment of FIG. 1, in accordance with an embodiment of the present disclosure;

FIG. 8 illustrates a branch routine for a dynamic directory of objects based on logical attributes, on a computing device within the computing environment of FIG. 1, in accordance with an embodiment of the present disclosure;

FIG. 9 illustrates a search routine for a dynamic directory of objects based on logical attributes, on a computing device within the computing environment of FIG. 1, in accordance with an embodiment of the present disclosure;

FIG. 10 illustrates a deletion scheme for a dynamic directory of objects based on logical attributes, on a computing device within the computing environment of FIG. 1, in accordance with an embodiment of the present disclosure;

FIG. 11 illustrates a high level insertion scheme for a dynamic directory of objects based on logical attributes, on a computing device within the computing environment of FIG. 1, in accordance with an embodiment of the present disclosure;

FIG. 12 illustrates an insert routine for a dynamic directory of objects based on logical attributes, on a computing device within the computing environment of FIG. 1, in accordance with an embodiment of the present disclosure;

DETAILED DESCRIPTION

Embodiments of the present invention recognize that identifying objects in the internet of things (IoT) is generally based on hardware specifications. Some methods of identifying objects in the IoT creates problems in dynamic settings where new objects are added or where one or more attributes associated with the objects change. Further recognized is that, generally devices can discover only those devices that are of a similar device technology. For example, a device utilizing Bluetooth® discovery techniques can only discover and identify other devices that are using Bluetooth® technology and within detection range of the first device. Embodiments of the present invention also recognize that similar challenges occur in service discovery architectures, wherein each standard for identifying objects has its own architecture for service discovery. Further recognized is that the IoT interconnects a number of heterogeneous objects. Consequently, there is a need for techniques that allow these heterogeneous objects to find each other in a uniform way.

Embodiments further recognize that some protocols and structures for accessing and maintaining distributed directory information services, such as lightweight directory access protocol (LDAP), require defining a directory schema before deployment. Commonly, prior domain knowledge (e.g., types of objects, object functionality) is used, resulting in a static schema. Generally, adding objects or features of the objects within the directory involves modification to the directory structure and schema. Thus, adding objects and features is not an easily scalable process.

Embodiments of the present invention provide for a dynamic directory of objects based on logical attributes. Embodiments of the present invention provide for creating a dynamic directory of heterogeneous objects based on attribute-value pairs associated with each of the objects. Embodiments of the present invention further provide for searching the directory for objects based on the attribute-value pairs.

Figure 1:
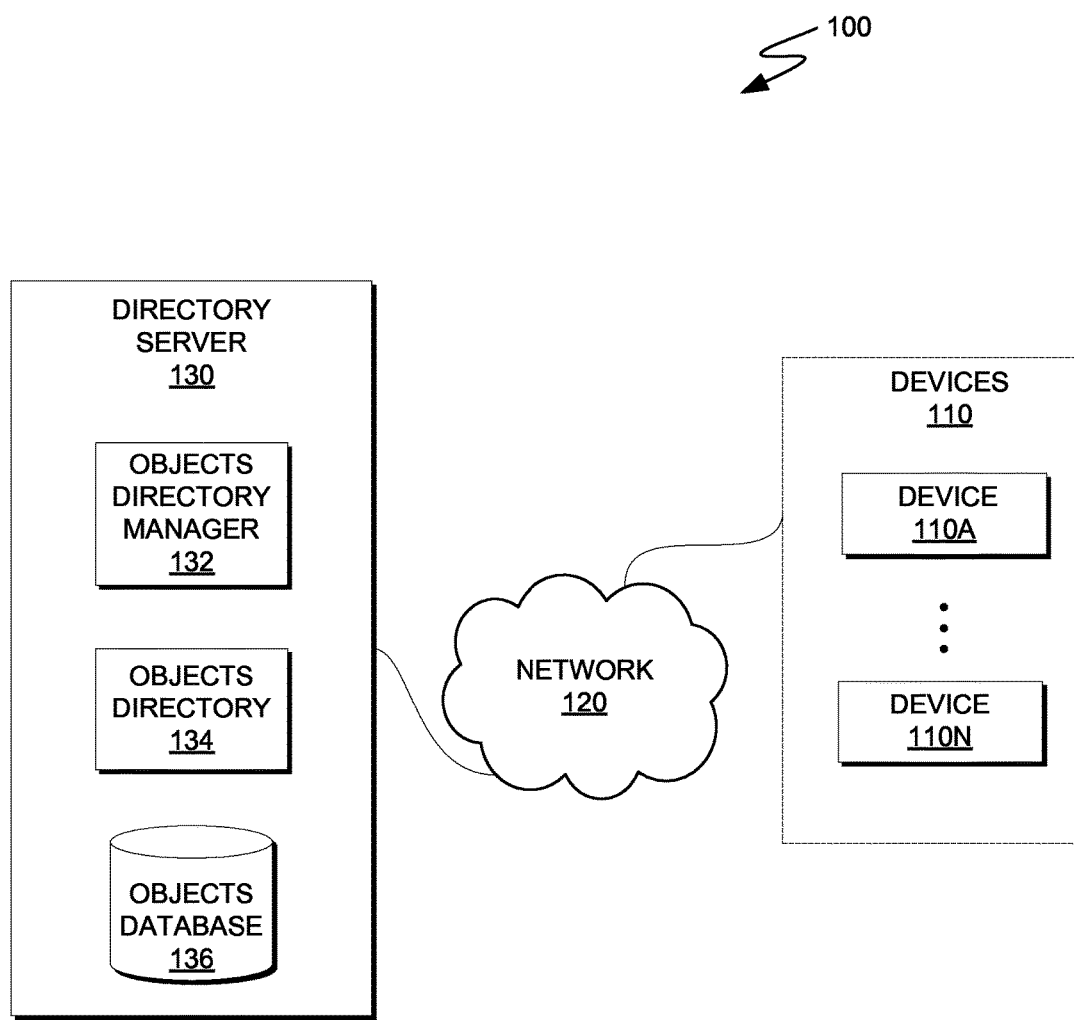
FIG. 1 is a functional block diagram of a computing environment, in accordance with an embodiment of the present disclosure.

Embodiments of the present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes device 110A through device 110N, and directory server 130, all connected via network 120. Device 110A through device 110N are sometimes collectively referred to as devices 110. Devices 110 may include a greater or lesser number of devices than depicted in FIG. 1. Directory server 130 includes objects directory manager 132, objects directory 134, and objects database 136.

In various embodiments, directory server 130 is a computing device that can be a standalone device, a server, a laptop computer, a tablet computer, a netbook computer, a personal computer (PC), or a desktop computer. In another embodiment, directory server 130 represents a computing system utilizing clustered computers and components to act as a single pool of seamless resources. In general, directory server 130 can be any computing device or a combination of devices with access to devices 110, and with access to and/or capable of executing some or all of objects directory manager 132, objects directory 134, and objects database 136. Directory server 130 may include internal and external hardware components, as depicted and described in further detail with respect to FIG. 4.

In this exemplary embodiment, objects directory manager 132, objects directory 134, and objects database 136 are stored on directory server 130. In other embodiments, some or all of objects directory manager 132, objects directory 134, and objects database 136 may reside on another computing device, provided that each can access and is accessible by each other of objects directory manager 132, objects directory 134, objects database 136 and devices 110. In yet other embodiments, some or all of objects directory manager 132, objects directory 134, and objects database 136 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between directory server 130 and devices 110, in accordance with a desired embodiment of the present invention.

Objects directory manager 132 operates to manage objects within computing environment 100. In some embodiments, objects directory manager 132 searches for and identifies new objects in computing environment 100. In some embodiments, objects directory manager 132 classifies the objects into a class and a subclass, creating an applicable DAG (Directed Acyclic Graph) of the objects under the subclass. In some embodiments, objects directory manager 132 updates metadata of the objects. In other embodiments, objects directory manager 132 adds or deletes objects from objects directory 134. Objects directory manager 132 classifies an new object into a class and a subclass by comparing the attributes of the new object with the attributes of objects already in each of the class and the subclass. Objects directory manager 132 further organizes the objects in the subclass into a tree structure, specifically a DAG, based on the attribute-value pairs of the objects.

Objects directory manager 132 superimposes complex DAG structures to enable high-speed searching of objects. In some embodiments, an ontology-based implementation is used when relationships among objects are also specified and inferences need to be drawn.

Objects directory 134 is a directory that includes objects identified and classified by objects directory manager 132. In some embodiments, objects within objects directory 134 are associated with a class, a subclass, and various attribute-value pairs. In some embodiments, each object in objects directory 134 is arranged in an object classification layer (OCL). Each OCL includes one or more classes and one or more subclasses. Classification of objects into classes and subclasses is used to provide a fast lookup search of objects in a scalable environment of IoT. The one or more attribute-value pairs associated with an object may be viewed as a DAG.

Objects database 136 is a data repository that may be written to and read by objects directory manager 132 and objects directory 134. Object data, such as OCL and DAG classifications, may be stored to objects database 136. In some embodiments, objects database 136 may be written to and read by devices 110 or by programs and entities outside of computing environment 100 in order to populate the repository with object data. Object data includes information that describes objects (e.g., class, subclass, attribute, attribute values, etc.).

In various embodiments of the present invention, devices 110 are a computing device that can be a standalone device, a server, a laptop computer, a tablet computer, a netbook computer, a personal computer (PC), a desktop computer, a personal digital assistant (PDA), a smart phone, sensor, wearable devices, or any programmable electronic device capable of communicating with directory server 130 via network 120. In another embodiment, devices 110 represents a computing system utilizing clustered computers and components to act as a single pool of seamless resources. In general, devices 110 can be any computing device or a combination of devices with access to directory server 130, and with access to and/or capable of executing some or all of objects directory manager 132, objects directory 134, and objects database 136. In some embodiments, devices 110 includes a user interface (UI) by which a user provides user input to devices 110. Devices 110 can communicate such user input, via network 120, to directory server 130. Devices 110 may include internal and external hardware components, as depicted and described in further detail with respect to FIG. 14.

FIG. 2 illustrates a DAG of a single object for dynamic directory of objects based on logical attributes, on a computing device within the computing environment of FIG. 1, in accordance with an embodiment of the present disclosure.

In one embodiment, a characteristic set of an object can be viewed as an object DAG with attributes and values, where the values are associated with the attributes. In another embodiment, a characteristic set is represented as a tree structure. In an example DAG depicted in FIG. 2, there are "n" attribute-value pairs, identified as attribute 1-value 1 (elements 202 and 204 respectively), attribute 2-value 2 (elements 206 and 208 respectively) through attribute n-value n (elements 210 and 212 respectively), in a characteristic set of object D1 (element 214). Attribute 1 (element 202) is associated with value 1 (element 204), attribute 2 (element 206) is associated with value 2 (element 208), and so on, with attribute n (element 210) having an association with value n (element 212). In one embodiment, attribute-value pairs are not ordered based on any weighting factors of attributes. As represented in FIG. 2, object D1 (element 214) is associated with all attribute-value pairs within the DAG.

FIG. 3 illustrates superimposed DAGs for two objects in a dynamic directory of objects based on logical attributes, on a computing device within the computing environment of FIG. 1, in accordance with an embodiment of the present disclosure.

In one embodiment, a graph of all objects in a subclass is a superimposition of the DAG of each of the objects in the subclass. In one example, a group of objects includes only two objects, D1 (element 214) and D2 (element 306). A graph of the group can be created by superimposing the DAG of object D1 (element 214) and the DAG of object D2 (element 306), as depicted in FIG. 3. In this example, Value 1 (element 204) is associated with two attributes, Attribute 2 (element 206) and Attribute 3 (element 302). Attribute 2 (element 206) is associated with object D1 (element 214), and Attribute 3 (element 302) is associated with object D2 (element 306). Object D1 (element 214) is associated with N attribute-value pairs (see FIG. 2 description). Object D2 (element 306) is associated with two attribute-value pairs, Attribute 1-Value 1 (elements 202 and 204 respectively) and Attribute 3-Value 3 (elements 302 and 304 respectively). In some embodiments, an attribute-value pair is associated with only one device. In some embodiments, an attribute-value pair is associated with multiple devices. In a subclass consisting of a large number of objects, such a superimposition will result in a very complex graph or tree-like structure.

Figure 4:
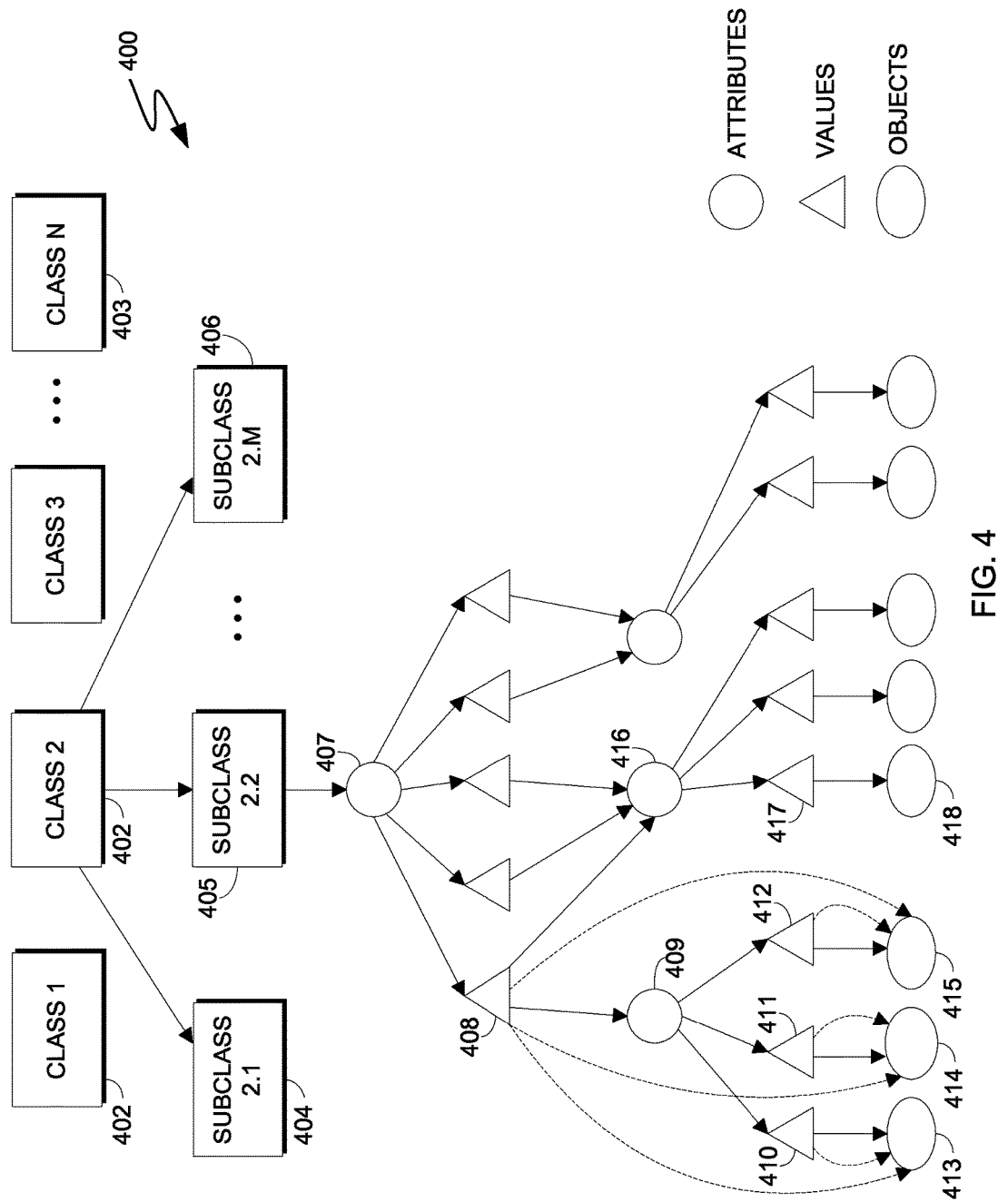
FIG. 4 depicts a directory organization for a dynamic directory of objects based on logical attributes, on a computing device within the computing environment of FIG. 1, in accordance with an embodiment of the present disclosure.

FIG. 4 depicts a directory organization for a dynamic directory of objects based on logical attributes, on a computing device within the computing environment of FIG. 1, in accordance with an embodiment of the present disclosure. FIG. 4 depicts dynamic directory 400.

In one embodiment, in order to overcome the complexity of tree structures and facilitate fast searches, objects in a directory are classified, using clustering, into one or more high-level classes, based on the attributes of the objects. Each class is further organized into one or more subclasses, based on attributes of the objects. The resulting organization of objects into classes and subclasses is carried out into an objects classification layer (OCL). Each class may include a different number of subclasses. The number of classes and the number of subclasses within a class depends upon the algorithm used in an OCL.

FIG. 4 depicts a directory with N number of classes, depicted as class 1 (element 401) through class N (element 403). FIG. 4 illustrates an example of class 2 (element 402) being further organized into M subclasses, labeled as subclass 2.1 (element 404), subclass 2.2 (element 405), through subclass 2.M (element 406). Each object within each subclass is further organized into a DAG, based on the attribute-value pairs associated with each of the objects, as discussed in FIG. 2. In one embodiment, a subclass is associated with two or more attribute nodes.

In this example, FIG. 4 illustrates a superimposition of DAGs of eight objects in subclass 2.2 (element 405). Attribute 407, an attribute node of subclass 2.2 (element 405), is associated with five values, the first of which is value 408. The attribute-value pair depicted by Attribute 407-value 408 is associated with four objects: object 413, object 414, object 415, and object 418, each of which is associated with one other attribute-value pair. Object 413 is associated with attribute 409-value 410. Object 414 is associated with attribute 409-value 411. Object 415 is associated with attribute 409-value 412. Object 418 is associated with attribute 416-value 417. In one embodiment, objects in a subclass are organized into a tree structure, wherein the root node of the subclass corresponds to the subclass.

In some embodiments, dynamic directory 400 is used by objects directory manager 132 to manage objects identified in within dynamic directory 400. In some embodiments, objects directory manager 132 manages objects based on a categorization of one or more objects. The categorization can be a class, subclass, attribute, or value. For example, objects directory manager 132 can manage all objects that are categorized under attribute 409. In this example, any action chosen for objects categorized under attribute 409 will affect object 413, object 414, and object 415. In another example, objects directory manager 132 can manage objects categorized under value 410. In this example, only object 413 will be affected by actions chosen for value 410. Dynamic directory 400 allows objects directory manager 132 to manage as few or as many objects at one time, based on attribute-value categorization.

Figure 5:
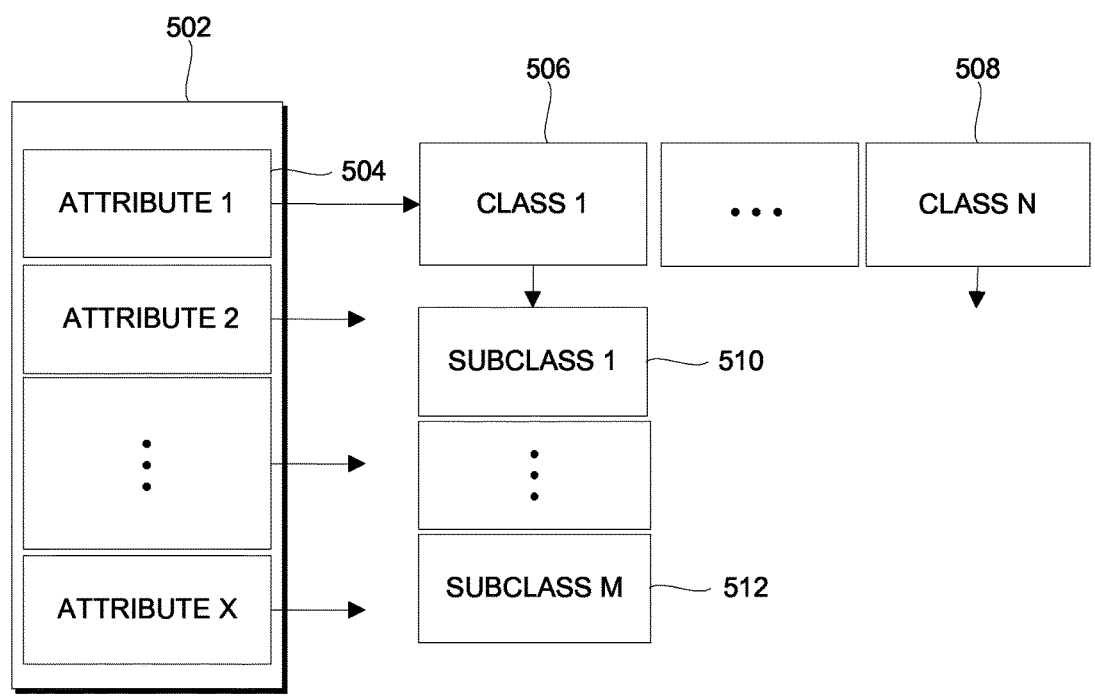
FIG. 5 illustrates a hash map structure for a dynamic directory of objects based on logical attributes, on a computing device within the computing environment of FIG. 1, in accordance with an embodiment of the present disclosure.

FIG. 5 illustrates a hash map structure for dynamic directory of objects based on logical attributes, on a computing device within the computing environment of FIG. 1, in accordance with an embodiment of the present disclosure.

A hash map, sometimes referred to as a hash table, is a data structure that is used to implement an associative array, a structure that maps one or more keys to a unique value. Hash maps are used in computer software for rapid data lookup. Hash maps use a hash function to accelerate table or database lookup by detecting duplicated records in a large file. Although different hash functions exist, and can be implemented, an embodiment of the present invention implements a JSW hash function.

In one embodiment, information about classes and subclasses in a directory are maintained above the cluster hierarchy as illustrated in FIG. 5. Hash map 502 includes a quantity of X attributes, each of which is a key that maps to a linear list of classes and subclasses, wherein a class and a subclass are as previously described. For example, attribute 1 (element 504) is a key that maps to a linear list of N classes, from class 1 (element 506) through class N (element 508). Each of the N classes is associated with zero or more subclasses. For example, class 1 (element 506) is associated with M subclasses, from subclass 1 (element 510) to subclass M (element 512).

Figure 6:
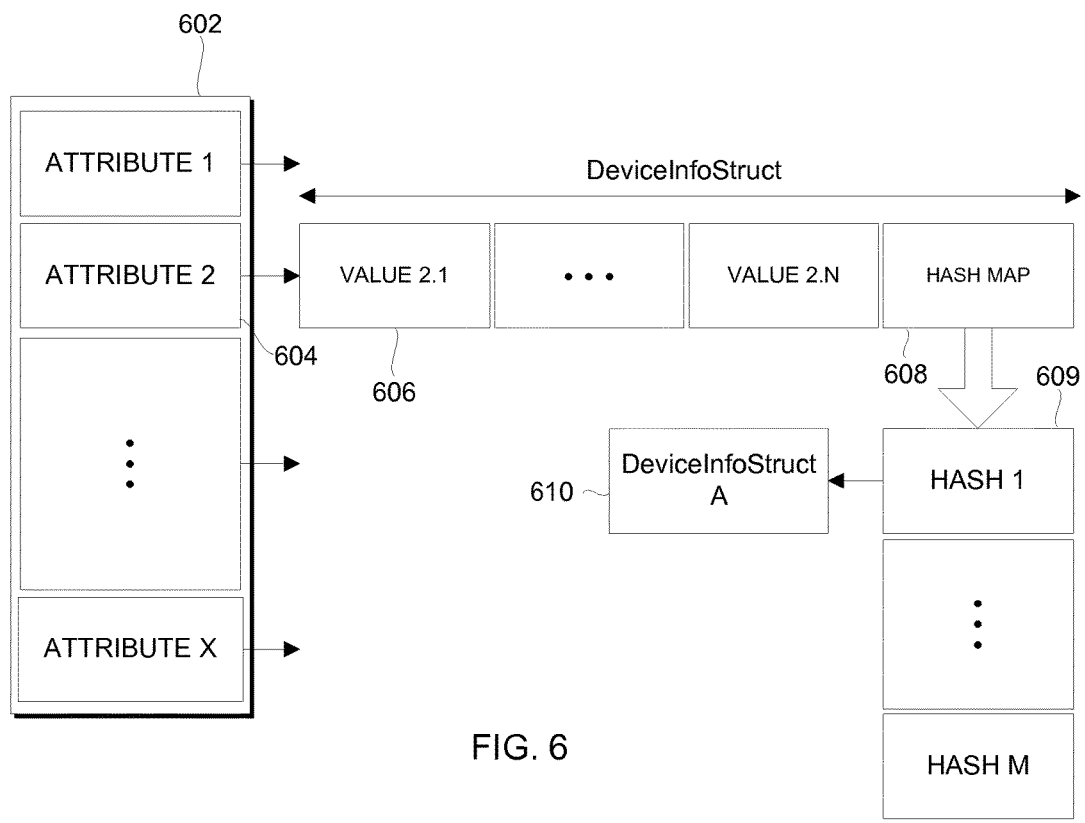
FIG. 6 illustrates a hash map structure for a dynamic directory of objects based on logical attributes, on a computing device within the computing environment of FIG. 1, in accordance with an embodiment of the present disclosure.

FIG. 6 illustrates a hash map structure for a dynamic directory of objects based on logical attributes, on a computing device within the computing environment of FIG. 1, in accordance with an embodiment of the present disclosure.

In one embodiment, a second hash map structure is maintained for each subclass. In FIG. 6, hash map 602 includes a quantity of X attributes, and maps from attribute to DeviceInfoStruct. The DeviceInfoStruct includes N entries wherein each entry contains a value of the hashed attributes and the list of objects (or a pointer to objects data or meta data) possessing the value of the hashed attribute. For example, attribute 2 (element 604), points to value 2.1 (element 606). In some embodiments, value 2.1 (element 606) includes a list of devices having the characterization of value 2.1. DeviceInfoStruct also has a hash map (element 608) of M entries, each maps a value to DeviceInfoStruct. The result of this structure is nested multiple DeviceInfoStructs for a hashed attribute. For example, hash 1 (element 609) includes nested DeviceInfoStruct A (element 610). This is done to support a large value set of attributes that characterize objects. In some embodiments, a linear search for an attribute value-pair can be expensive.

Figure 7:
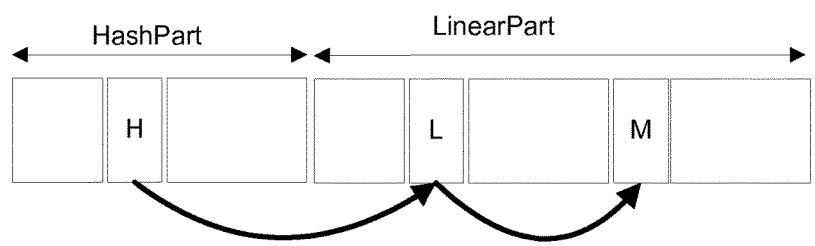
FIG. 7 illustrates a hash map structure for a dynamic directory of objects based on logical attributes, on a computing device within the computing environment of FIG. 1, in accordance with an embodiment of the present disclosure.

FIG. 7 illustrates a hash map structure for a dynamic directory of objects based on logical attributes, on a computing device within the computing environment of FIG. 1, in accordance with an embodiment of the present disclosure.

To reduce a potentially expensive linear search for values of an attribute, the value array of N entries as in the example illustrated in FIG. 6 may be performed as illustrated in FIG. 7. The search is defined by two parts, HashPart which has a number of entries defined by the variable q, and LinearPart which is defined by a variable of n. For entries[1 . . . n], a first segment of values will be called HashPart[1, . . . , q], and the remaining values will be called LinearPart [q+1, . . . , n]. The first q entries are accessed by using a value as a key to a hash function to obtain a hash value of H, and then using the corresponding hash function to access a skip-list beginning from HashPart[H] extending into a LinearPart[L] as shown in FIG. 7. Every entry in the LinearPart contains a pointer to a subsequent entry (e.g., LinearPart [M]). This is done because a single hash value H may be obtained for multiple values of an attribute. An experiment with n=32 and m=256 and a depth=4 has resulted in storage of nearly one million entries corresponding to values of an attribute, assuming that a good hashing is chosen, leading to a nearly uniform distribution, leading to a look up of only four such DeviceInfoStructs. This would help in overcoming the near linear search behavior of hashes asymptotically.

FIG. 8 illustrates a branch routine for a dynamic directory of objects based on logical attributes, on a computing device within the computing environment of FIG. 1, in accordance with an embodiment of the present disclosure.

The format of the branch routine, as depicted in FIG. 8, is BRANCH(value, depth). In one embodiment, a branch routine as depicted in FIG. 8 is called by DeviceInfoStruct at location depth to determine the child DeviceInfoStruct at location depth+1. In one embodiment, the root DeviceInfoStruct is at depth 0. In order to branch from an $(i-1)^{th}$ level to an $i^{th}$ level, the character i positions from the right is used as an input to a hash function to obtain the hash_value. The hash_value returned is used to refer the child DeviceInfoStruct to branch to the location that is stored in hash table in DeviceInfoStruct.

FIG. 9 illustrates a search routine for a dynamic directory of objects based on logical attributes, on a computing device within the computing environment of FIG. 1, in accordance with an embodiment of the present disclosure.

The format of the search function, as depicted in FIG. 9, is SEARCH(root, value, depth), where root is DeviceInfoStruct at a depth from where the search will be conducted. To conduct a search from the root of the DeviceInfoStruct tree, a search string is called using a depth of 0, as in SEARCH(root, value, 0). SEARCH( ) begins to look for the value in the skip-list corresponding to the hash value h, from HashPart[H]. If at a node, the value in the skip-list matches the value that is stored in that node, then that node is returned. If a node is not found in the skip-list, then a determination is made as to whether there are one or more characters remaining in the value to branch further. If there are one or more characters remaining, the SEARCH( ) routine is executed recursively, otherwise, the search routine returns a null value. This SEARCH routine is a basic search routine. To search for an object, for each of the specified attributes, first the class and the subclass are ascertained. Next, within the subclass, the SEARCH( ) routine is called. The response to the search is the intersection of all such SEARCH ( ) routines of all specified attributes.

FIG. 10 illustrates a deletion routine for a dynamic directory of objects based on logical attributes, on a computing device within the computing environment of FIG. 1, in accordance with an embodiment of the present disclosure.

The format of the deletion routine is DELETION_SCHEME(root,value,deviceID), as depicted in FIG. 10. In line 1, SEARCH(root, value, 0) routine is executed to search for a node that contains the input value. If the search function identifies a node that contains the input value, then the deviceID is removed from the DeviceList of the node. If the search function does not identify a node that contains the input value, then no changes are made.

If a node is found, the routine then determines whether the node is the last node in a skip-list and the DeviceList of the node is empty. If those two conditions are met, then the node is labeled "Not Occupied" and the skip-list is truncated by 1 node. If the node that is found is not the last node in the skip-list, yet the DeviceList is empty, then the node is labeled "Empty" to preserve the skip-list.

FIG. 11 illustrates a high level insertion scheme for a dynamic directory of objects based on logical attributes, on a computing device within the computing environment of FIG. 1, in accordance with an embodiment of the present disclosure.

The format of the high level insertion scheme, as depicted in FIG. 11, is INSERTION_SCHEME(root,value,deviceID), in which root is the root of the DeviceInfoStruct tree. This routine operates to first determine whether a value for the input deviceID already exists in the DeviceInfoStruct tree, and if not, insert the value into the DeviceInfoStruct tree.

The first step is to call the routine SEARCH(root,value,0) to determine whether there is an entry in the DeviceInfoStruct tree having the corresponding value. If no such entry exists then INSERT(root,value,deviceID,0) is executed. If an entry in the DeviceInfoStruct tree does have the corresponding value, then deviceID is added to the DeviceList of the node, and the node, if labeled anything other than "Occupied", is labeled "Occupied".

FIG. 12 illustrates an insert routine for a dynamic directory of objects based on logical attributes, on a computing device within the computing environment of FIG. 1, in accordance with an embodiment of the present disclosure.

The format of the insert routine, as depicted in FIG. 12, is INSERT(root,value,deviceID,depth), in which root is the root of the DeviceInfoStruct tree. This routine operates to search for an entry in which to insert a value for deviceID, by branching to a depth equal to the length of an entry (i.e., number of characters in the string). If no entry is found that meets this condition, the routine searches for an entry that has a value length greater than the length of the input value. If the routine identifies an entry with a value length that is greater than the length of the input value, the entry is updated with the input value and the input deviceID. The INSERT( ) routine is repeated to find an entry for the replaced value and the associated DeviceList at greater depths as it still has characters left to branch. If no such replaceable entry is found then value is inserted into an entry in the Over Flow List of the last DeviceInfoStruct reached at the depth equal to length of value.

A node or an entry may have one of the following three status values:
1. Not Occupied—Initially, all nodes are labeled "Not Occupied".
2. "Occupied"—Responsive to a value being placed in an entry, the entry is marked with "Occupied".
3. "Empty"—This status implies that an entry is still part of a skip-list, even though the entry does not contain a value. This status is assigned responsive to the deviceList of a value becoming empty during deletion and the corresponding entry is available for inserting new values with the same hash value. If an Empty status is not assigned in this manner, there is a risk of corrupting the skip-list.

In lines 1 through 3, flag is assigned 0 if branching to a depth equal to the length of value is completed and no further branching is possible from the current DeviceInfoStruct. Flag is assigned 1 if further branching is possible.

In lines 6 through 14, the routine makes determinations regarding the skip-list. In lines 7 through 9, if a first entry marked Empty is identified, then value and the corresponding deviceID are entered into the first entry. In line 10, the last node in the skip-list is assigned the variable last. In lines 11 through 13, if the depth is greater than or equal to the length of value, then the program searches for an entry in the skip-list wherein the length of value in the entry is greater than the input value length. In lines 15 through 20, the program searches for an entry marked "Not Occupied" in LinearPart[ ] and, if such an entry is found, the program inserts the value and deviceID into the entry, and links the entry with the last of the skip-list.

In lines 21 through 23, the program determines whether depth is less than the length of value, and if so, a branch is executed recursively, by calling the INSERT( ) routine, replacing depth with depth+1.

In lines 24 through 29, if an entry of rep_node was identified with a length of value stored greater than the input value, then value is stored at rep_node and the program recursively calls INSERT( ) with the old value in rep_node.

In line 30, the program stores value in an entry in the current DeviceInfoStruct's Over Flow List, OFL[ ].

Figure 13:
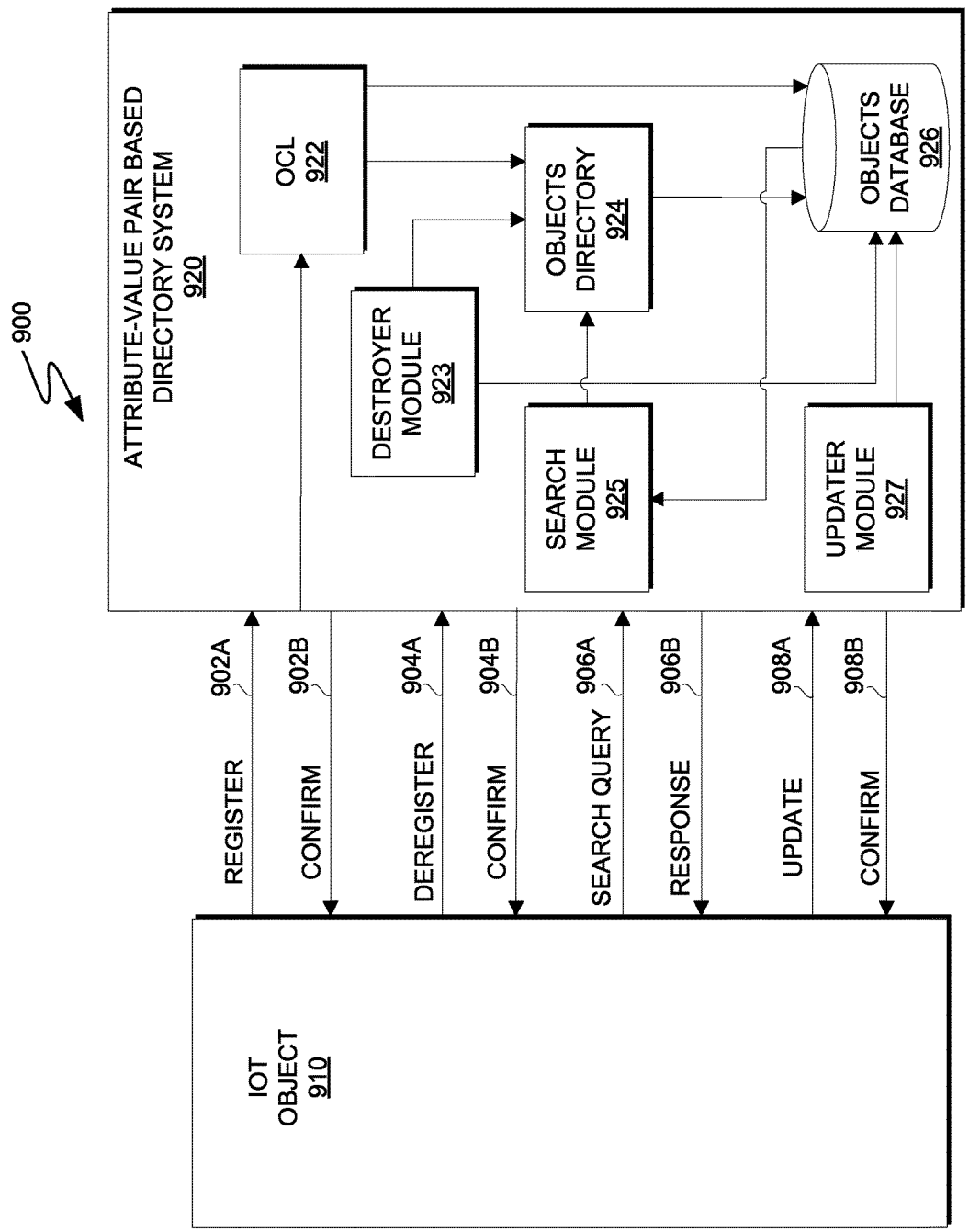
FIG. 13 is a block diagram of an exemplary environment of a computing device executing operations for a dynamic directory of objects based on logical attributes, in accordance with an embodiment of the present disclosure.

FIG. 13 is a block diagram of system components of a computing device executing operations for a dynamic directory of objects based on logical attributes, in accordance with an embodiment of the present disclosure.

FIG. 13 depicts an exemplary environment 900, in which IoT object 910 communicate with attribute-value pair based directory system (AVPBDS) 920 via request and command pairs 902A and 902B through 908A and 908B.

IoT object 910 represents one or more heterogeneous devices in the IoT, such as device 110A. For purposes of explanation of FIG. 13, IoT object 910 will be referred to as a single device; however, IoT object 910 can include multiple devices.

AVPBDS 920 is a directory system that operates to receive input from IoT object 910, process the input, and send a response to IoT object 910. In one embodiment, AVPBDS 920 is an example of directory server 130. AVPBDS 920 includes OCL 922, destroyer module 923, objects directory 924, search module 925, objects database 926, and updater module 927. In some embodiments, OCL 922, destroyer module 923, search module 925, and updater module 927 together are an example of objects directory manager 132. In some embodiments, objects directory 924 is an example of objects directory 134. In some embodiments, objects database 926 is an example of objects database 136.

In some embodiments, environment 900 is used to register an object. For example, IoT object 910 sends request 902A to AVPBDS 920 and receives response 902B from AVPBDS 920. For example, request 902A is sent to AVPBDS 920 from a mobile device that is new to environment 900, requesting that the mobile device be registered in environment 900. The request includes characteristic data (i.e., attribute-value pairs) about the mobile device. AVPBDS 920 receives the request, organizes and classifies the mobile device into the OCL (i.e., classes and subclasses) based on the characteristic data included in the request. AVPBDS 920 creates entries in the objects directory and objects database which, in some embodiments, includes the classification of IoT object 910. AVPBDS 920 sends a confirmation response (e.g., response 902B) to the mobile device, confirming that the mobile device is registered.

In some embodiments, environment 900 is used to de-reregister an object. For example, IoT object 910 sends request 904A to AVPBDS 920 and receives response 904B from AVPBDS 920. For example, request 904A is sent from a mobile device that is being removed from environment 900 (e.g., taken out of service) to AVPBDS 920, requesting that the mobile device be deregistered from environment 900. AVPBDS 920 receives the request, processes the request, utilizing destroyer module 923 to delete information about the mobile device from objects directory 924 and objects database 926, and sends a confirmation response (e.g., response 904B) to the mobile device, confirming that the mobile device has been deregistered.

In some embodiments, environment 900 is used to find and manage objects. For example, IoT object 910 sends request 906A to AVPBDS 920 and receives response 906B from AVPBDS 920. For example, request 906A is sent from a mobile device to AVPBDS 920, requesting that a search be conducted to identify all wireless devices within environment 900. AVPBDS 920 receives the request, processes the request, utilizing search module 925 to conduct a search of objects directory 924 and objects database 926, and sends response 906B, with results of the search, to the mobile device.

In some embodiments, environment 900 is used to update object information. For example, IoT object 910 sends request 908A to AVPBDS 920 and receives response 908B from AVPBDS 920. For example, request 908A is sent from a mobile device to AVPBDS 920, requesting an update be made to information in AVPBDS 920 regarding attribute-value pairs of the mobile device. In one example, the update request may indicate that a new version of firmware is resident on the mobile device. AVPBDS 920 receives the request, utilizes updater module 927 to update (i.e., modify) information about the mobile device in objects directory 924 and objects database 926, and sends a confirmation response (e.g., response 908B) to the mobile device to confirm that updates have been completed.

Figure 14:
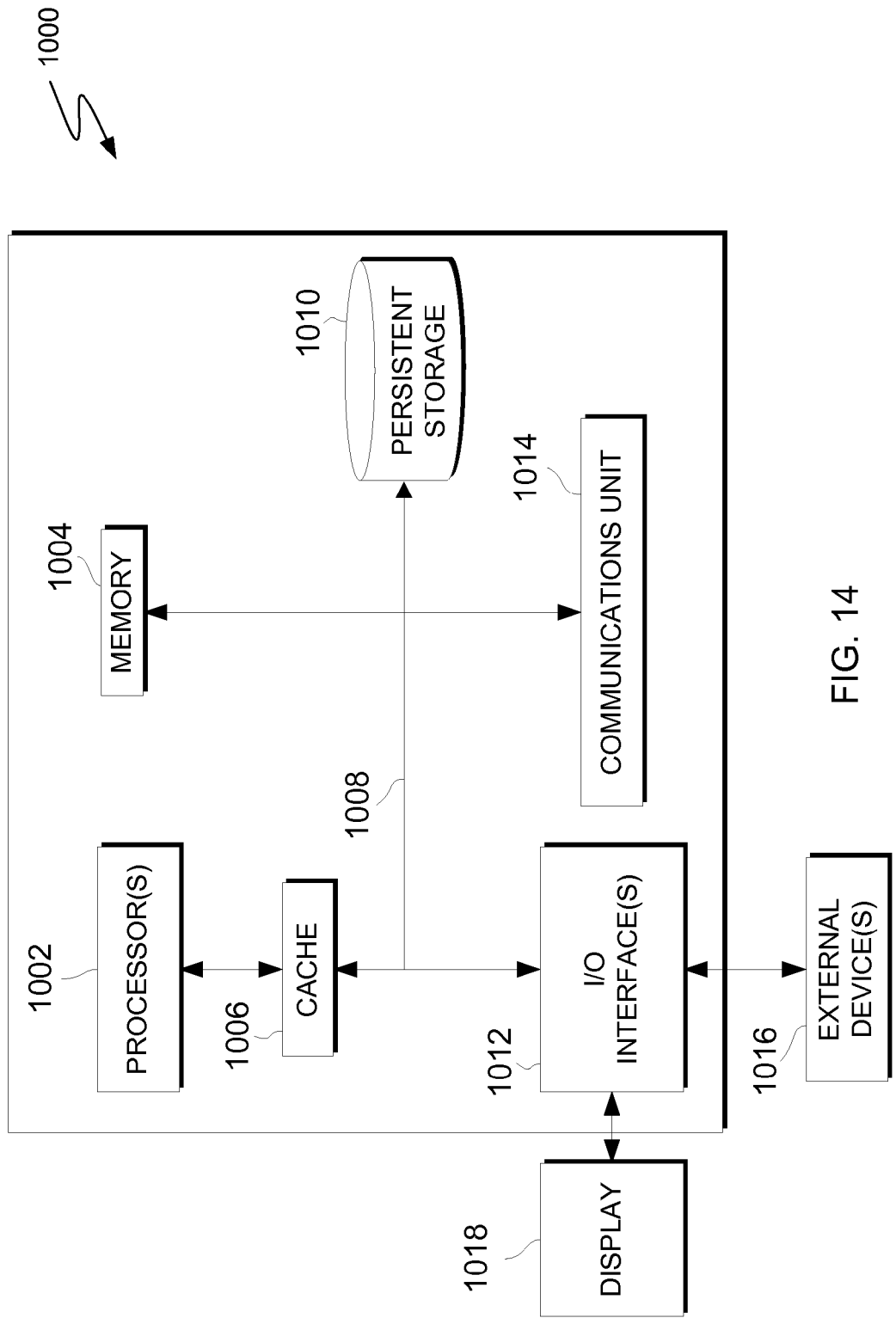
FIG. 14 is a block diagram of components of a computing device executing operations for a dynamic directory of objects based on logical attributes, in accordance with an embodiment of the present disclosure.

FIG. 14 is a block diagram of components of a computing device, generally designated 1000, in accordance with an embodiment of the present disclosure. In one embodiment, computing system 1000 is representative of directory server 130. For example, FIG. 14 is a block diagram of directory server 130 within computing environment 100 executing operations of objects directory manager 132.

It should be appreciated that FIG. 14 provides only an illustration of one implementation and does not imply any limitations with regard to the environments in which different embodiments may be implemented. Many modifications to the depicted environment may be made.

Computing system 1000 includes processor(s) 1002, cache 1006, memory 1004, persistent storage 1010, input/output (I/O) interface(s) 1012, communications unit 1014, and communications fabric 1008. Communications fabric 1008 provides communications between cache 1006, memory 1004, persistent storage 1010, communications unit 1014, and input/output (I/O) interface(s) 1012. Communications fabric 1008 can be implemented with any architecture designed for passing data and/or control information between processors (such as microprocessors, communications and network processors, etc.), system memory, peripheral devices, and any other hardware components within a system. For example, communications fabric 1008 can be implemented with one or more buses or a crossbar switch.

Memory 1004 and persistent storage 1010 are computer readable storage media. In this embodiment, memory 1004 includes random access memory (RAM). In general, memory 1004 can include any suitable volatile or non-volatile computer readable storage media. Cache 1006 is a fast memory that enhances the performance of processor(s) 1002 by holding recently accessed data, and data near recently accessed data, from memory 1004.

Program instructions and data used to practice embodiments of the present invention may be stored in persistent storage 1010 and in memory 1004 for execution by one or more of the respective processor(s) 1002 via cache 1006. In an embodiment, persistent storage 1010 includes a magnetic hard disk drive. Alternatively, or in addition to a magnetic hard disk drive, persistent storage 1010 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1010 may also be removable. For example, a removable hard drive may be used for persistent storage 1010. Other examples include optical and magnetic disks, thumb drives, and smart cards that are inserted into a drive for transfer onto another computer readable storage medium that is also part of persistent storage 1010.

Communications unit 1014, in these examples, provides for communications with other data processing systems or devices. In these examples, communications unit 1014 includes one or more network interface cards. Communications unit 1014 may provide communications through the use of either or both physical and wireless communications links. Program instructions and data used to practice embodiments of the present invention may be downloaded to persistent storage 1010 through communications unit 1014.

I/O interface(s) 1012 allows for input and output of data with other devices that may be connected to each computer system. For example, I/O interface(s) 1012 may provide a connection to external device(s) 1016 such as a keyboard, keypad, a touch screen, and/or some other suitable input device. External device(s) 1016 can also include portable computer readable storage media such as, for example, thumb drives, portable optical or magnetic disks, and memory cards. Software and data used to practice embodiments of the present invention can be stored on such portable computer readable storage media and can be loaded onto persistent storage 1010 via I/O interface(s) 1012. I/O interface(s) 1012 also connect to display 1018.

Display 1018 provides a mechanism to display or present data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
  receiving, by one or more processors, a request to modify a dynamic directory of a plurality of objects operably connected to a network, wherein:
    each of the plurality of objects comprises a computing device,
    each of the plurality of objects is associated with one or more attribute-value pairs,
    the one or more attribute-value pairs are organized in a hierarchical structure comprising one or more classes, the one or more classes comprise one or more subclasses, the one or more subclasses include one or more attributes, the one or more attributes comprise one or more values, each attribute including a key that maps to a linear list of representative classes and subclasses, and the dynamic directory is organized as a directed acyclic graph (DAG);

determining, by one or more processors, one or more first object attribute-value pairs associated with a first object;

searching, by one or more processors, the dynamic directory for the one or more first object attribute-value pairs utilizing a hash map, wherein the hash map includes the one or more attributes;

identifying, by one or more processors, a first attribute-value pair of the one or more first object attribute-value pairs, wherein the first attribute-value pair is different than the one or more attribute-value pairs associated with the plurality of objects; and modifying, by one more processors, the dynamic directory based on the first attribute-value pair, wherein modifying the dynamic directory comprises: (i) adding the first object to the dynamic directory, and (ii) modifying an attribute-value pair of the first object.

2. The method of claim 1, wherein the plurality of objects are heterogeneous objects.

3. The method of claim 1, wherein the each of (i) the one or more classes, (ii) the one or more subclasses, (iii) the one or more attributes, and (iv) the one or more values, is based on a plurality of characteristics of the plurality of objects.

4. The method of claim 3, wherein the first attribute-value pair is a characteristic unique to the first object.

5. The method of claim 3, wherein the dynamic directory can be searched based on one or more of (i) the one or more classes, (ii) the one or more subclasses, (iii) the one or more attributes, (iv) and the one or more values.

6. The method of claim 5, further comprising:

searching, by one or more processors, the dynamic directory for one or more of (i) the one or more classes, (ii) the one or more subclasses, (iii) the one or more attributes, (iv) and the one or more values;

identifying, by one or more processors, one or more objects of the plurality of objects based on results of the searching; and managing, by one or more processors, the one or more objects.

7. A computer program product, the computer program product comprising:

a computer readable storage medium and program instructions stored on the computer readable storage medium, the program instructions comprising:

program instructions to receive a request to modify a dynamic directory of a plurality of objects operably connected to a network, wherein:

each of the plurality of objects comprises a computing device;

each of the plurality of objects is associated with one or more attribute-value pairs, the one or more attribute-value pairs are organized in a hierarchical structure comprising one or more classes, the one or more classes comprise one or more subclasses, the one or more subclasses include one or more attributes, the one or more attributes comprise one or more values, each attribute including a key that maps to a linear list of representative classes and subclasses, and the dynamic directory is organized as a directed acyclic graph (DAG);

program instructions to determine one or more first object attribute-value pairs associated with a first object;

program instructions to search the dynamic directory for the one or more first object attribute-value pairs utilizing a hash map, wherein the hash map includes the one or more attributes;

program instructions to identify a first attribute-value pair of the one or more first object attribute-value pairs, wherein the first attribute-value pair is different than the one or more attribute-value pairs associated with the plurality of objects; and program instructions to modify the dynamic directory based on the first attribute-value pair, wherein modifying the dynamic directory comprises: (i) adding the first object to the dynamic directory, and (ii) modifying an attribute-value pair of the first object.

8. The computer program product of claim 7, wherein the plurality of objects are heterogeneous objects.

9. The computer program product of claim 7, wherein the each of (i) the one or more classes, (ii) the one or more subclasses, (iii) the one or more attributes, (iv) and the one or more values, is based on a plurality of characteristics of the plurality of objects.

10. The computer program product of claim 9, wherein the first attribute-value pair is a characteristic unique to the first object.

11. The computer program product of claim 9, wherein the dynamic directory can be searched based on one or more of (i) the one or more classes, (ii) the one or more subclasses, (iii) the one or more attributes, (iv) and the one or more values.

12. The computer program product of claim 11, further comprising:

program instructions to search the dynamic directory for one or more of (i) the one or more classes, (ii) the one or more subclasses, (iii) the one or more attributes, (iv) and the one or more values;

program instructions to identify one or more objects of the plurality of objects based on results of the search; and program instructions to manage the one or more objects.

13. A computer system, the computer system comprising:

one or more computer processors;

one or more computer readable storage media;

program instructions stored on the computer readable storage media for execution by at least one of the one or more processors, the program instructions comprising:

program instructions to receive a request to modify a dynamic directory of a plurality of objects operably connected to a network, wherein:

each of the plurality of objects comprises a computing device;

each of the plurality of objects is associated with one or more attribute-value pairs, the one or more attribute-value pairs are organized in a hierarchical structure comprising one or more classes, the one or more classes comprise one or more subclasses, the one or more subclasses include one or more attributes, the one or more attributes comprise one or more values, each attribute including a key that maps to a linear list of representative classes and subclasses, and the dynamic directory is organized as a directed acyclic graph (DAG);

program instructions to determine one or more first object attribute-value pairs associated with a first object;

program instructions to search the dynamic directory for the one or more first object attribute-value pairs utilizing a hash map, wherein the hash map includes the one or more attributes;

program instructions to identify a first attribute-value pair of the one or more first object attribute-value pairs, wherein the first attribute-value pair is different than the one or more attribute-value pairs associated with the plurality of objects; and program instructions to modify the dynamic directory based on the first attribute-value pair, wherein modifying the dynamic directory comprises: (i) adding the first object to the dynamic directory, and (ii) modifying an attribute-value pair of the first object.

14. The computer system of claim 13, wherein the plurality of objects are heterogeneous objects.

15. The computer system of claim 13, wherein the each of (i) the one or more classes, (ii) the one or more subclasses, (iii) the one or more attributes, (iv) and the one or more values, is based on a plurality of characteristics of the plurality of objects.

16. The computer system of claim 15, wherein the first attribute-value pair is a characteristic unique to the first object, and wherein the dynamic directory can be searched based on one or more of (i) the one or more classes, (ii) the one or more subclasses, (iii) the one or more attributes, (iv) and the one or more values.

17. The computer system of claim 16, further comprising:

program instructions to search the dynamic directory for one or more of (i) the one or more classes, (ii) the one or more subclasses, (iii) the one or more attributes, (iv) and the one or more values;

program instructions to identify one or more objects of the plurality of objects based on results of the search; and program instructions to manage the one or more objects.

* * * * *